US009542639B1

(12) United States Patent
Buescher

(10) Patent No.: US 9,542,639 B1
(45) Date of Patent: Jan. 10, 2017

(54) RFID TRANSPONDER WITH RECTIFIER AND VOLTAGE LIMITER

(71) Applicant: EM Microelectronic-Marin S.A., Marin (CH)

(72) Inventor: Kevin Buescher, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 14/753,710

(22) Filed: Jun. 29, 2015

(51) Int. Cl.
G06K 7/06 (2006.01)
G06K 7/08 (2006.01)
G06K 19/077 (2006.01)

(52) U.S. Cl.
CPC ................ *G06K 19/07783* (2013.01)

(58) Field of Classification Search
USPC ......................... 235/451, 492, 441
See application file for complete search history.

(56) References Cited

U.S. PATENT DOCUMENTS

| | | | | |
|---|---|---|---|---|
| 4,090,150 A * | 5/1978 | Vachenauer | ........... | G01S 7/28 327/351 |
| 5,383,080 A * | 1/1995 | Etoh | ........... | G05F 1/465 361/56 |
| 5,875,390 A * | 2/1999 | Brehmer | ........... | H04B 17/318 455/226.2 |
| 6,304,613 B1* | 10/2001 | Koller | ........... | G06K 19/0701 235/492 |
| 6,585,166 B1* | 7/2003 | Ookawa | ........... | G06K 19/07 235/441 |
| 6,637,664 B1* | 10/2003 | Yoshigi | ........... | G06K 19/07 235/441 |
| 8,055,228 B2* | 11/2011 | Park | ........... | H03F 3/45183 327/350 |
| 2003/0235058 A1* | 12/2003 | Toyoshima | ........... | G05F 1/56 363/13 |
| 2005/0135520 A1* | 6/2005 | Gamble | ........... | H03G 7/001 375/349 |
| 2007/0046474 A1* | 3/2007 | Balachandran | .... | G06K 19/0723 340/572.7 |
| 2007/0273485 A1* | 11/2007 | Balachandran | ....... | G06F 1/3203 340/10.34 |
| 2008/0204241 A1* | 8/2008 | Di. Zettler | ......... | G06K 19/0723 340/572.1 |

* cited by examiner

*Primary Examiner* — Tuyen K Vo
(74) *Attorney, Agent, or Firm* — Oblon, McClelland, Maier & Neustadt, L.L.P.

(57) ABSTRACT

The present invention relates to a transponder, which comprises an antenna and a multi-stage rectifier. The antenna is connected to an input of the multi-stage rectifier having m rectifier stages, and a shunt limiter is connected to an output of the rectifier and connected to an $n_{th}$ stage of the multi-stage rectifier, wherein $n<m$.

15 Claims, 3 Drawing Sheets

RFID TRANSPONDER WITH RECTIFIER AND VOLTAGE LIMITER

TECHNICAL FIELD

The invention relates to the field of transponders and in particular to RFID (radio-frequency identification) transponders operable to exchange RF signals with other transponders for various application purposes. Moreover, the invention particularly relates to a rectifier and a voltage limiter of an RFID transponder.

BACKGROUND OF THE INVENTION

Conventional RFID transponders comprise a voltage limiter, e.g. in form of a voltage clamp to prevent the output of an RFID rectifier from exceeding a certain voltage. Such a limiter is necessary to prevent damage to internal components of the RFID transponder by excessive voltage and to limit the supply voltage range for the operation of the RFID transponder and its electronic circuits. The limiters conventionally used in RFID transponders or RFID circuits often lack accuracy and a voltage level to clamp makes it difficult to guarantee that a clamp voltage is greater than the minimum allowed supply voltage or less than the maximum allowed supply voltage.

The patent application US 2014/0268964 A1 discloses for instance a multi-stage programmable rectifier wherein each rectifier stage can include a first transistor and a switch connected thereto. There, a threshold voltage of the first transistor can be programmed through selection of one of a plurality of voltages available at the switch.

Implementation of numerous switches in a multi-stage programmable rectifier is rather sophisticated. Moreover, limiting of a DC output voltage of a programmable rectifier requires a rather extensive calibration or tuning of said rectifier.

SUMMARY OF THE INVENTION

It is an aim of the present invention to provide a transponder with a rectifier and with a limiter that provides a high degree of accuracy, a comparatively high gain and which is operable without a voltage reference and/or bias current. Moreover, the rectifier and limiter should exhibit improved and almost instantaneous temporal response behavior when activated.

In a first aspect, the invention relates to a transponder, in particular to an RFID transponder comprising an antenna and comprising a multi-stage rectifier. The antenna is connected to an input of the multi-stage rectifier. The multi-stage rectifier has multiple rectifier stages, namely m rectifier stages with m being an integer number larger than 1. The transponder further comprises a shunt limiter connected to an output of the rectifier. The shunt limiter is further connected to an $n_{th}$ stage of the multi-stage rectifier. Here, the integer number n is smaller than the integer number m. In other words, the shunt limiter is connected to a particular stage of the multi-stage rectifier, wherein this particular stage may be any stage except the last stage of the multi-stage rectifier.

Combining a multi-stage rectifier with a shunt limiter to provide rectification and limitation of an input voltage of an RF-powered transponder provides a rather simple architecture and design which is easy and cost efficient to implement. Moreover, the combination of the multi-stage rectifier with a shunt limiter provides increased accuracy. A reference voltage and/or a bias current is not required at all. Also, the startup behavior of the combination of the multi-stage rectifier and the shunt limiter is quite spontaneous and does not require any sophisticated tuning or calibration. In addition, the combination of a multi-stage rectifier with a shunt limiter is rather compact and provides a space saving arrangement and space-saving design of the transponder.

The shunt limiter does not require a reference voltage, a bias current, or a differential amplifier. It provides moderately high loop gain to allow the limiter to function over a wide range of power. By connecting the output of the rectifier with the shunt limiter and by further connecting the $n_{th}$ stage of the multi-stage rectifier with the shunt limiter a feedback loop is provided by way of which a rather accurate operation of the limiter can be obtained.

According to another embodiment, the shunt limiter comprises a first transistor having a drain and a source. Here, one of the source and the drain is connected to the output of the rectifier. Typically, the other one of the source and the drain is connected to ground, typically via a load. The transistor is typically implemented as a MOSFET (metal oxide semiconductor field effect transistor). For instance, by connecting the drain of the transistor to the output of the multi-stage rectifier and by connecting the source of the transistor to ground, an output of the rectifier above a maximum allowable voltage level can be directly and efficiently reduced. An excess current above a predefined maximum level at the output of the multi-stage rectifier can be directly shunted to ground.

According to another embodiment, the first transistor of the shunt limiter also comprises a gate that is connected to the $n_{th}$ stage of the multi-stage rectifier. Operation of the first transistor is therefore controlled by the voltage level available at the $n_{th}$ stage of the multi-stage rectifier. By using the voltage created across one or more, hence across n stages of the multi-stage rectifier a controlled feedback circuit for the limiter can be provided.

In a further embodiment, the shunt limiter also comprises a first resistor connecting the other one of the drain and the source of the first transistor with ground. Supposed that the drain of the first transistor is connected to the output of the multi-stage rectifier, then the source of the first transistor is connected to ground via the first resistor. In an alternative embodiment, wherein the source of the first transistor is connected to the output of the multi-stage rectifier, it is the drain of said first transistor that is connected to ground via the at least first resistor. In any case, the resistor is used as a load for the first transistor. In this way, use of a current source can be avoided that would otherwise introduce startup concerns and unnecessary dissipation of electrical power.

If a current through the first transistor is rather low, hence when limiting does actually not occur, there is only little or almost no current or power consumption in the limiter. This is beneficial in low power RFID transponders. Hence, the limiter will not degrade performance when it is actually not limiting. Hence, there is no static current or power consumption of the limiter when in a non-limiting mode.

According to a further embodiment, the shunt limiter also comprises a second transistor having a drain and a source. Here, one of the drain and the source is connected to the output of the rectifier. Typically, it is the drain of the second transistor that is connected to the source of the rectifier output. In this way, the drains of first and second transistors may be connected in parallel to the output of the rectifier.

But there are other configurations conceivable, wherein for instance the source of the second transistor is connected to the output of the rectifier.

The configuration and specific design of the second transistor is directly related to the configuration and design of the first transistor.

In another embodiment, the second transistor comprises a gate connected to a node, which node is connected to the first resistor and to one of the source and the drain of the first transistor. If the drain of the first transistor is connected to the output of the rectifier, the node is connected to the source of the first transistor. Moreover, the node is placed between the first transistor and the resistor. Hence, said node is connected to ground via the first resistor. By connecting the gate of the second transistor to said node, the gate of the second transistor is controlled by the current through the first transistor. Typically, the other one of the drain and source of the second transistor located remote from the output of the rectifier is directly connected to ground. For instance, if the drain of the second transistor is connected to the output of the rectifier, it is the source of the second transistor that is directly connected to ground. In this way and once the second transistor is turned on, it will shunt current to ground and thus limit the output of the rectifier.

According to another embodiment, the drain of the second transistor is connected to the source of the first transistor. In typical embodiments, the drain of the second transistor is connected to both, to the source and to the drain of the first transistor. In a further embodiment, the shunt limiter comprises a compensation circuit or compensation assembly connecting the drain of one of the first and second transistors with the source of the other one of the first and second transistors. Typically, the compensation circuit connects the source of the first transistor with the drain of the second transistor. In further implementations and according to another embodiment, the compensation circuit comprises a second resistor in series with a capacitor. Hence, the compensation circuit provides an RC assembly. Since the circuit formed by the multi-stage rectifier and the shunt limiter comprises multiple poles, the compensation circuit is beneficial to improve stability and to counteract a potential drift of the output of the rectifier and/or shunt limiter.

According to a further embodiment, the first transistor is a PMOS transistor that could be also implemented as a NMOS transistor.

According to another embodiment, the second transistor is a NMOS transistor. Typically, first and second transistors form a combination of a PMOS transistor and a NMOS transistor. The first transistor may be implemented as a PMOS transistor while the second transistor is implemented as a NMOS transistor. However, various other configurations and combinations of PMOS and NMOS transistors are likewise conceivable.

In another embodiment, each stage of the multi-stage rectifier comprises an input capacitor, wherein the input capacitors of the multi-stages are connected in parallel.

In a further embodiment, each stage of the multi-stage rectifier comprises an output capacitor, wherein one node of the output capacitor is connected via a diode or via at least one transistor to the input capacitor and wherein the other node of the output capacitor is connected to ground.

In a further embodiment, each stage of the multi-stage rectifier comprises a rectifier arrangement. Each rectifier arrangement comprises at least one transistor or at least one diode. In a typical embodiment, each rectifier arrangement comprises two transistors, namely a NMOS transistor connected in series with a PMOS transistor. A node connecting the two transistors is further connected to the input capacitor of a respective rectifier stage. The rectifier arrangements of the multiple stages are connected in series. Typically, the output capacitor of each stage is connected with a node located between the rectifier arrangements of adjacently located rectifier stages.

In this way, the stages of the multi-stage rectifier are connected in series. The DC output voltage of each stage is greater than the preceding stage and also grows to be greater than the input voltage. The voltage obtained at the $n_{th}$ stage of the multi-stage rectifier is smaller than the input voltage. In this way, a rectifier tap connected to the output capacitor of the $n_{th}$ stage of the multi-stage rectifier and being further connected to the gate of the first transistor of the shunt limiter provides a kind of a voltage divider.

According a further embodiment a rectifier tap connected to the output capacitor of the $n_{th}$ stage of the multi-stage rectifier is connected to the gate of the first transistor of the shunt limiter. In this way a driving voltage can be provided at the gate of the first transistor which is lower than the voltage across the entire rectifier.

Implementing the multi-stage rectifier on the basis of various diodes or MOS transistors is beneficial in that a voltage is instantly available at the $n_{th}$ stage of the multi-stage rectifier. In this way, eventual startup issues of the transponder and its rectifier or limiter can be effectively decreased or avoided.

According to another aspect, the invention also relates to an electronic device comprising a transponder as described above. The transponder, typically implemented as an RFID transponder may be implemented in a large variety of electronic devices, typically in portable electronic devices, such as mobile phones, tablet computers or wristwatches.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

Figure 1:
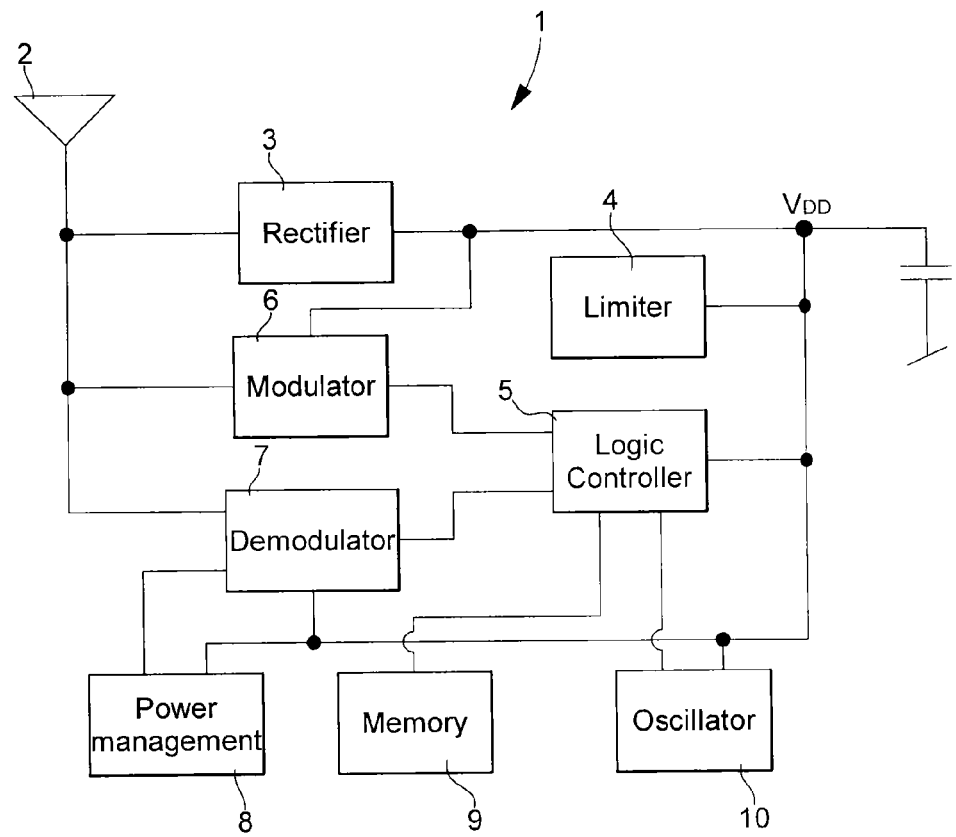
FIG. 1 schematically shows a conventional transponder according to the prior art.

In FIG. 1, a conventional transponder 1, typically implemented as an RFID transponder is shown. The transponder 1 comprises an antenna 2 that is connected to a modulator 6 and a demodulator 7. Moreover, the antenna 2 is connected to a rectifier 3 that serves to transfer a RF signal received by the antenna 2 into a DC signal in order to provide a power source for the various electronic components of the RFID transponder 1. At the output of the rectifier 3, a driving voltage $V_{DD}$ is provided. The output of the rectifier 3 is further connected with a limiter 4. The demodulator 7 as well as the modulator 6 are connected with a logic controller 5, which is driven by the voltage provided at the output of the rectifier 3.

The RFID transponder 1 as shown in FIG. 1 further comprises a power management 8, a memory 9 as well as an oscillator 10. Power management 8, memory 9 and oscillator 10 are all connected to the logic controller. Power management 8, memory 9 and oscillator 10 are further driven by the voltage $V_{DD}$ obtainable at the output of the rectifier 3.

Figure 2:
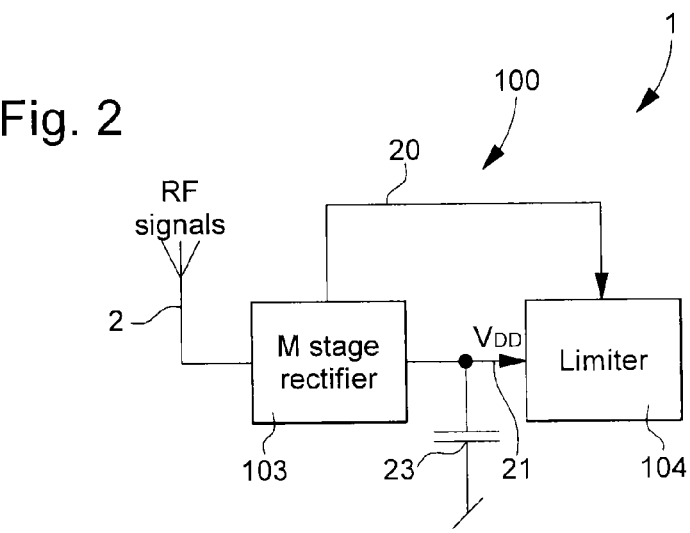
FIG. 2 shows the assembly of a multi-stage rectifier in combination with a shunt limiter according to a first embodiment of the present invention.

In FIG. 2, the general configuration of the transponder 100 according to one embodiment of the present invention is schematically illustrated. For illustration purpose in FIG. 2, there are only shown an antenna 2, a multi-stage rectifier 103 and a shunt limiter 104. The output 21 of the multi-stage rectifier 103 provides an output voltage $V_{DD}$. The output 21 is connected to the shunt limiter 104. Moreover, there is provided a rectifier tap 20 that is connected to an $n_{th}$ stage of the multi-stage rectifier 103. The rectifier tap 20 is also connected to the shunt limiter 104. The output 21 of the multi-stage rectifier 103 is tied to ground $V_{SS}$ by a capacitor 23.

Figure 3:
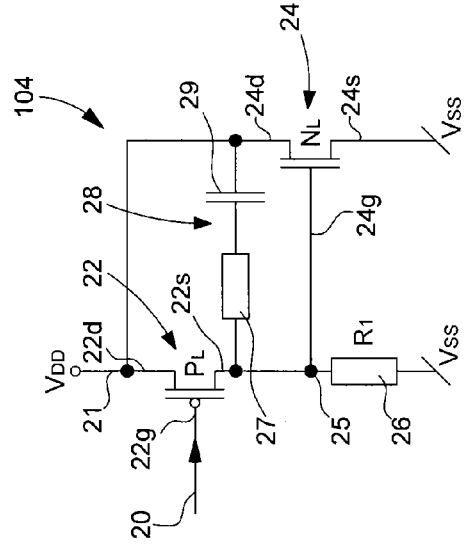
FIG. 3 shows a more detailed illustration of the shunt limiter according to FIG. 2.

In FIG. 3, an exemplary embodiment of the shunt limiter 104 is provided. The shunt limiter 104 comprises a first transistor 22 and a second transistor 24. In the present embodiment, the first transistor 22 is implemented as a PMOS transistor $P_L$ while the second transistor 24 is implemented as a NMOS transistor $N_L$. As it is illustrated in FIG. 3, the gate 22g of the first transistor 22 is connected to the rectifier tap 20 which is connected to the $n_{th}$ stage of the multi-stage rectifier 103. The drain 22d of the first transistor 22 is connected to the output 21 of the multi-stage rectifier $V_{DD}$.

A source 22s of the first transistor is connected with a node 25 and further with a first resistor 26. The source 22s of the first transistor 22 is connected to ground $V_{SS}$ via the first resistor 26.

The second transistor 24 has a gate 24g that is connected to said node 25. Hence, the gate 24g is tied to ground $V_{SS}$ via the first resistor 26. The gate 24g is also connected to the source 22s of the first transistor 22. A drain 24d of the second transistor 24 is connected to the output 21 of the multi-stage rectifier 103. The drain 24d of the second transistor 24 is also connected to the drain 22d of the first transistor 22. The source 24s of the second transistor 24 is connected to ground $V_{SS}$.

In addition, there is provided a compensation circuit 28 comprised of a second resistor 27 and a capacitor 29 that are connected in series. Here and as shown in FIG. 3, the drain 24d of the second transistor 24 is connected to the source 22s of the first transistor 22 via said compensation circuit 28.

Figure 4:
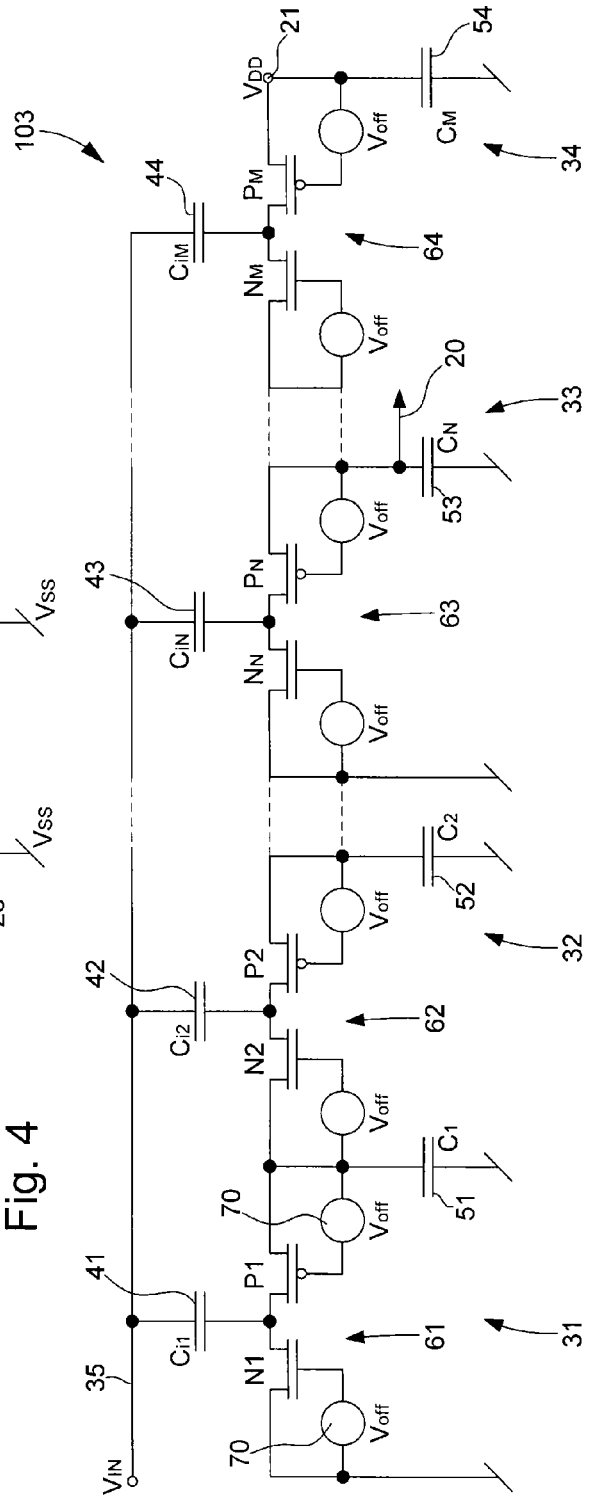
FIG. 4 shows a more detailed illustration of the multi-stage rectifier according to FIG. 2.

In FIG. 4, the general architecture of a multi-stage rectifier 103 is shown in more detail. Here, only four stages of a multi-stage rectifier 103 are shown. The multi-stage rectifier 103 comprises a first stage 31, a second stage 32 and eventually further stages that are not illustrated. In a generalized view, the multi-stage rectifier 103 comprises an $n_{th}$ stage 33 and an $m_{th}$ stage 34. Here, the $m_{th}$ stage 34 represents the last stage of the multi-stage rectifier 103 and provides an output 21 with a rectified supply voltage $V_{DD}$. The $n_{th}$ stage 33 represents an arbitrary stage located between the first stage 31 and the last stage 34.

The input 35 of the multi-stage rectifier 103 is connected with a series of input capacitors 41, 42, 43, 44. The input capacitors 41, 42, 43, 44 of the various stages 31, 32, 33, 34, respectively are connected in parallel with the input 35 of the multi-stage rectifier 103. The input capacitors 41, 42, 43, 44 are each connected to a rectifier arrangement 61, 62, 63, 64, wherein the rectifier arrangements 61, 62, 63, 64 of the various stages 31, 32, 33, 34 are all connected in series. In the embodiment according to FIG. 4, each rectifier arrangement 61, 62, 63, 64 comprises a NMOS transistor N1, N2, Nn, Nm and a PMOS transistor P1, P2, Pn, Pm.

NMOS and PMOS transistors of each rectifier arrangement 61, 62, 63, 64 are connected in series. A node connected with the source of the NMOS transistor N1 with the drain of the PMOS transistor P1 is connected to the input capacitor 41. Each rectifier stage 31, 32, 33, 34 also comprises an output capacitor 51, 52, 53, 54. Each output capacitor 51, 52, 53, 54 is connected to ground and is connected to a node located between two adjacently arranged rectifier arrangements 61, 62, 63, 64. In detail, the output capacitor 51 of the first stage 31 is connected to a node located connected to the rectifier arrangement 61 of the first stage 31 connected to the rectifier arrangement 62 of the second stage 32. Each stage 31, 32, 33, 34 is further provided with two auxiliary charge pumps 70 connected to the gate of the stage's NMOS transistor and PMOS transistor, respectively.

As it is explicitly shown in FIG. 4, the $n_{th}$ stage 33 is provided with a rectifier tap 20 which is further connected to the gate 22g of the first transistor 22 of the shunt limiter 104.

The function of the combination of the multi-stage rectifier 103 with the shunt limiter 104 is as follows. The shunt limiter 104 will begin to shunt current to ground when the voltage between the output 21 of the multi-stage rectifier 103 and the gate 22g of the first transistor 22 reaches the threshold voltage of said first transistor 22. As the gate voltage at the gate 22g increases, the current through the first transistor 22 will increase until enough voltage is built up across the first resistor 26 to turn on the second transistor 24. Once the second transistor 24 turns on, it will shunt current to ground and will thus limit the output 21 of the multi-stage rectifier 103.

When the current through the first transistor 22 times the resistance of the compensation circuit 28 is equal to the threshold voltage of the second transistor 24 a full limiting will take place. Prior to this condition little or no current will be consumed in the limiter 104. This is of particular benefit in a low power RFID transponder 100 as the shunt limiter 104 will not degrade performance when it is not limiting. The onset of the limiter beginning to function occurs under the following condition:

$V_{rec} = V_{thPL} \cdot m/(m-n)$, wherein $V_{thPL}$ is the threshold voltage of the first transistor 22, m is the total number of stages of the multi-stage rectifier 103, and n is the number of stages from the multi-stage rectifier input to the $n_{th}$ stage thereof being connected to the gate 22g of the first transistor 22. In a practical implementation with for instance a six stage rectifier 103, wherein the fourth stage being used and connected to the gate 22g of the first transistor 22 of the shunt limiter 104 and with a threshold voltage of the first transistor of 600 mV a limiter with a clamp voltage of 1.8 V will be provided.

Then, the gain of the limiter can be expressed as follows: $((n/m) \cdot gm_{PL} \cdot R1) \cdot gm_{NL} \cdot R_{rect}$, wherein n/m is the feedback ratio of the rectifier, $gm_{PL}$ is the trans-conductance of the first transistor 22, R1 is the resistance of the first resistor 26, $gm_{NL}$ is the trans-conductance of the second transistor and $R_{rect}$ is the output impedance of the rectifier 103.

Typically, the loop gain of the arrangement of the multi-stage rectifier 103 with the shunt limiter 104 can be configured to be in a range between 20-40 dB. But in typical implementations, it depends on the amount of current the limiter 104 is shunting as this current affects the trans-conductance of both, the first and the second transistors 22, 24. Hence, the gain increases as the shunt current increases. When compared to a simple passive limiter such as a stack of diodes the presently described inventive embodiments provide numerous benefits. The combination of a multi-stage rectifier 103 with a shunt limiter 104 has a narrower range of onset of limiting. There is only one variation of a threshold voltage, whereas a stack of diodes inherently comprises multiple variations of threshold voltages. The present embodiments also have higher loop gain, which facilitates a tighter range of output voltage versus shunt current.

When compared to an active limiter, typically implementing a differential amplifier scheme, there are also some advantages with the currently described configuration. The combination of a multi-stage rectifier 103 with a shunt limiter 104 does not require an explicit voltage reference, such as a band gap or an equivalent reference. This helps to reduce current and power consumption. The present combination does also not require a current source to bias any transistors. This again saves power and complexity. A further benefit arises in that the combination of the multi-stage rectifier 103 with a shunt limiter 104 does not come along with any startup issues. A typical active loop solution would require a voltage reference and/or bias currents. Both of these must be available and at the proper operation condition for the limiter to function correctly. This makes it very difficult for the limiter to start properly. The combination of the shunt limiter 104 with the multi-stage rectifier 103 does not rely on any external references and thus will start-up right away without the necessity of any calibration or tuning.

Figure 5:
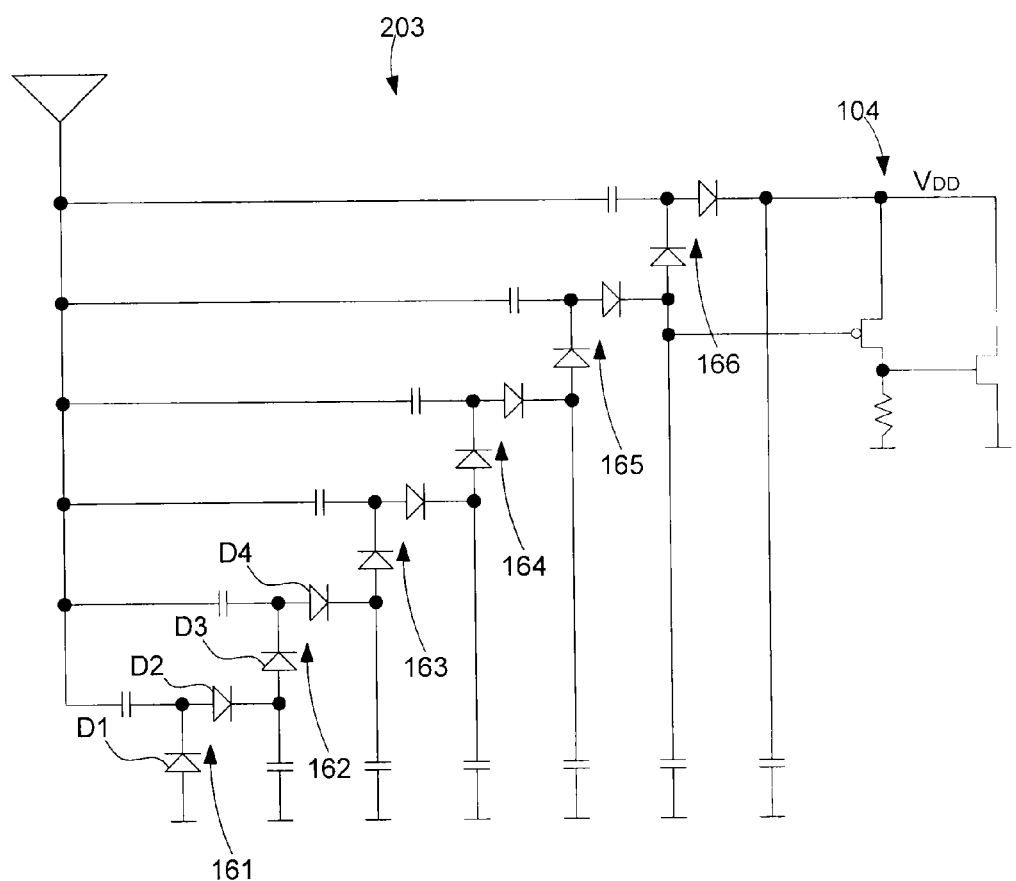
FIG. 5 shows another schematic implementation of a combination of a multi-stage rectifier with a shunt limiter.

In FIG. 5, another implementation of a combined multi-stage rectifier 203 with a shunt limiter 104 is illustrated. Here, the multi-stage rectifier 203 comprises a series of diode arrangements. In comparison to the configuration according to FIG. 4, the rectifier arrangements 161, 162, 163, 164, 165, 166 each comprise two diodes instead of a combination of an NMOS transistor and a PMOS transistor. In the sketch of FIG. 5 only the diodes D1, D2 of the rectifier arrangement 161 and the diodes D3, D4 of the rectifier arrangement 162 are illustrated. Apart from that, each rectifier stage also comprises an input capacitor and an output capacitor. As it is shown in FIG. 5, the fifth stage of the multi-stage rectifier 203 is connected to the shunt limiter 104.

What is claimed is:

1. A transponder, comprising:
an antenna, and
a multi-stage rectifier,
wherein the antenna is connected to an input of the multi-stage rectifier having m rectifier stages,
wherein a shunt limiter is both connected to an output of the rectifier and connected to an $n_{th}$ stage of the multi-stage rectifier, wherein n<m, and
wherein the multi-stage rectifier has a plurality of stages m and the nth stage of the multi-stage rectifier, where n<m, is connected to the shunt limiter which is also connected to the output of the multi-stage rectifier, the multi-stage rectifier having the antenna connected to the input thereof.

2. The transponder according to claim 1, wherein the shunt limiter comprises a first transistor having a drain and a source, wherein one of the source and the drain is connected to the output of the rectifier.

3. The transponder according to claim 2, wherein the first transistor of the shunt limiter comprises a gate connected to the $n_{th}$ stage of the multi-stage rectifier.

4. The transponder according to claim 2, wherein shunt limiter comprises a first resistor connecting the other one of the drain and the source of the first transistor with ground Vss.

5. The transponder according to claim 2, wherein the shunt limiter comprises a second transistor having a drain and a source, wherein one of the drain and the source is connected to the output of the rectifier.

6. The transponder according to claim 5, wherein the second transistor comprises a gate connected to a node connected with a first resistor and with one of the source and the drain of the first transistor.

7. The transponder according to claim 5, wherein the drain of the second transistor is connected to the source of the first transistor.

8. The transponder according to claim 5, wherein the shunt limiter comprises a compensation circuit connecting the drain of one of the first and second transistors with the source of the other one of the first and the second transistors.

9. The transponder according to claim 8, wherein the compensation circuit comprises a second resistor in series with a capacitor.

10. The transponder according to claim 2, wherein the first transistor is a PMOS transistor.

11. The transponder according to claim 5, wherein the second transistor is a NMOS transistor.

12. The transponder according to claim 1, wherein each stage of the multi-stage rectifier comprises an input capacitor, wherein the input capacitors of the multiple stages are connected in parallel.

13. The transponder according to claim 1, wherein each stage of the multi-stage rectifier comprises an output capacitor.

14. The transponder according to claim 12, wherein each stage of the multi-stage rectifier comprises a rectifier arrangement comprising at least one transistor or at least one diode.

15. An electronic device comprising a transponder according to claim 1.

* * * * *